United States Patent Office 2,865,913
Patented Dec. 23, 1958

2,865,913
ARYLSULFONYL DERIVATIVES OF BICYCLIC GUANIDINES

Arthur Ferguson McKay, Pointe Claire, Quebec, and Maria-Elisabeth Kreling, Montreal, Quebec, Canada, assignors to Monsanto Canada Limited, Ville LaSalle, Quebec, Canada No Drawing. Application October 28, 1957
Serial No. 692,576

Claims priority, application Great Britain April 29, 1957

4 Claims. (Cl. 260—239.9)

The present invention is directed to 1-arylsulphonyl derivatives of bicyclic guanidines, corresponding to the general formula:

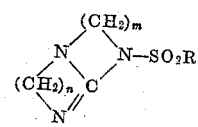

wherein $n$ is an integer from 2 to 4, $m$ is an integer from 2 to 3, and R representing a para-substituted phenyl group in which the substituent is one of the group including nitro, amino, acetylamino and methyl, that is to say R is a radical selected from the group consisting of para-nitro phenyl, para-amino phenyl, para-acetylamino phenyl and para-methyl phenyl.

The arylsulfonyl derivatives of the invention are readily obtained by the following preferred procedure. To a stirred aqueous solution of the bicyclic amine is added an excess (suitably up to about two equivalents) of the appropriate arylsulfonyl chloride and ether. To this mixture there is then added slowly a solution of aqueous alkali, in an amount not less than that equivalent to the sulfone chloride used. Stirring is then continued for a further short period, after which the precipitated product is removed by filtration and dried. The above reactions are carried on substantially at, or slightly above, room temperature, but preferably not in excess of about 35–40° C.

While the above describes a preferred practice for carrying out our invention, it is to be understood that the invention is not limited thereto. For example, anhydrous pyridine may be used both as reaction solvent and HCl acceptor, and temperatures substantially above ambient may be employed, for example, in the range 60–100° C. recovering the reaction product by dilution of the mixture with water. The reaction may also be carried out using aqueous acetone as the solvent.

Of the compounds contemplated in this invention, the 1-p-toluenesulfonyl, 1-p-aminobenzenesulfonyl and 1-p-acetylaminobenzenesulfonyl derivatives have been demonstrated to possess excellent bacteriostatic properties. For example, the sulphonamides of the invention are effective bacteriostats against the following organisms: Staph. pyogenes (R), Sarcina lutea, Strept. faecalis, Aero. aerogenes, E. coli #198, S. pullorum, Ps. aeruginosa, Pr. mirabilis, Pr. vulgaris, Staph. pyogenes (S).

The compounds of the invention may be prepared for use as bacteriostatic agents. They may be with an active or inert complementary material or carrier. The carrier may comprise binding agents, diluents, and any of the other constituents generally employed for preparations of this type, or may be another active substance or substances, or both inert and active substances.

The 1-p-aminobenzenesulfonyl compounds are readily prepared from the corresponding acetyl derivatives. For example, an aqueous alcoholic solution of the acetyl compound is boiled with an excess of alkali, cooling and filtering off the precipitated free amine.

The bicyclic guanidino amines used as starting materials in these preparations can be obtained by the methods disclosed in copending application Serial No. 692,577, filed October 28, 1957, the disclosure of which is hereby incorporated by reference.

The following examples are given to illustrate the invention, but are not to be construed as limiting its scope.

EXAMPLE I

*1-p-toluenesulfonyl-2,3,5,6-tetrahydro-1-imidaz (1,2-a) imidazole*

($n=m=2$, Ar=p-tolyl)

A solution of 2,3,5,6-tetrayhdro-1-imidaz (1,2-a) imidazole (0.555 part) in water was placed in a three-necked flask fitted with stirrer, dropping funnel and thermometer. p-Toluenesulfonyl chloride (M. P. 66–69° C.; 1.9 parts) and ether (12 parts by volume) were added to this solution. To this stirred mixture was added the calculated amount of 3.75 N aqueous sodium hydroxide solution (2.6 parts by volume) over a period of 40 minutes. The stirring was continued for a further fifteen minutes after which the precipitate was removed by filtration and dried, yield 1.3 parts (99%).

The melting point of the crude product was raised from 180–183° C. to 182–184° C. by crystallizing from boiling ethyl acetate containing a little methanol. Analytical results obtained were as listed in the Table I.

EXAMPLE II

*1-p-acetylaminobenzenesulfonyl-2,3,5,6-tetrahydro-1-imidaz (1,2a) imidazole*

($n=m=2$, Ar=p-acetylaminophenyl)

This compound (M. P. 236–245° C.) was prepared in 94.5% yield by the reaction of p-acetylaminobenzenesulfonyl chloride (M. P. 145° C.) with 2,3,5,6-tetrahydro-1-imidaz (1,2a) imidazole (16.67 parts) under the conditions described in Example I. A sample of the crude product melted at 270–271.5° C. after it was crystallized three times from nitromethane. Analytical units obtained are listed in the Table I.

EXAMPLE III

*1-p-toluenesulfonyl-$\Delta^8$-hexahydro-1,4,8-pyrimidazole*

($n=3$, $m=2$, Ar=p-tolyl)

To a stirred solution of $\Delta^8$-hexahydro-1,4,8-pyrimidazole (5.0 parts) and p-toluenesulfonyl chloride (7.60 parts) in water (25 parts by volume) covered with ether (20 parts by volume) was added a solution of sodium hydroxide (11 parts by volume of 3.65 N sodium hydroxide solution).

After the dropwise addition of the sodium hydroxide solution, which required twenty minutes, the reaction mixture was stirred for an additional forty minutes at room temperature. The product was recovered by filtration, yield 11.06 parts (99.5%). This product was purified by crystallizing from ethyl acetate. Melting point and analytical data obtained are listed in the Table I.

EXAMPLE IV

*1-p-acetylaminobenzenesulfonyl-$\Delta^8$-hexahydro-1,4,8-pyrimidazole*

($n=3$, $m=2$, Ar=p-acetylaminophenyl)

This compound was prepared by the method described in the above examples. Results obtained are listed in the Table I.

EXAMPLE V

1-p-toluenesulfonyl-Δ⁹-1,4,9-triazabicyclo (5.3.0.) decene

($n=4$, $m=2$, Ar=p-tolyl)

This compound was prepared by the method described in Example III, above. Results obtained are listed in Table I.

EXAMPLE VI

1-p-acetylaminobenzenesulfonyl-Δ⁹-1,4,9-triazabicyclo (5.3.0) decene

($n=4$, $m=2$, Ar=p-acetylaminophenyl)

This compound was prepared by the method described in Example III, above. Results obtained are listed in Table I.

EXAMPLE VII

1-p-nitrobenzenesulfonyl-2,3,5,6-tetrahydro-1-imidaz (1,2-a) imidazole

($n$ and $m=2$, Ar=p-nitrophenyl-)

This compound was prepared by the procedure outlined in Example III, above. Results obtained are listed in Table I.

EXAMPLE VIII

1-p-aminobenzenesulfonyl-2,3,5,6-tetrahydro-1-imidaz (1,2-a) imidazole

($n$ and $m=2$, Ar=p-aminophenyl-)

A mixture of 1-(p-acetylaminobenzenesulfonyl)-2,3,5,6-tetrahydro-1-imidaz (1,2-a) imidazole (9 parts), ethanol (200 parts) and 5 N sodium hydroxide solution (50 parts) was heated under reflux. After five minutes a homogeneous solution was obtained and the refluxing was continued for a further ten minutes. The solution on cooling and diluting with water deposited crystals, yield 6.7 parts by weight (85.8%). The crude product, which melted at 181–184° C., was purified by crystallization from acetone-hexane (4:1) solvent. The properties of this compound are given in Table I.

EXAMPLE IX

1-p-aminobenzenesulfonyl-Δ⁹-1,4,9-triazabicyclo (5.3.0) decene

($n=2$, $m=4$, Ar=p-aminophenyl-)

This compound was prepared from 1-p-acetylaminobenzenesulfonyl-Δ⁹-1,4,9-triazabicyclo (5.3.0.) decene by the procedure described in Example VIII, above. The product was crystallized from acetone-hexane (2:1) solvent. Results obtained are listed in Table I.

TABLE I.—ARYLSULFONYL DERIVATIVES OF THE BICYCLIC GUANIDINES

| Compound | Yield, Percent | M. P. (° C.) | Formula | C Calcd. | C Found | H Calcd. | H Found | N Calcd. | N Found | S Calcd. | S Found |
|---|---|---|---|---|---|---|---|---|---|---|---|
| 1-p-Toluenesulfonyl-2,3,5,6-tetrahydro-1-imidaz (1,2-a) imidazole | 99 | 182–184 | $C_{12}H_{15}N_3O_2S$ | 54.31 | 54.36 | 5.70 | 5.63 | 15.84 | 16.13 | 12.08 | 11.84 |
| 1-p-Acetylaminobenzenesulfonyl-2,3,5,6-tetrahydro-1-imidaz (1,2-a) imidazole | 94.5 | 270–271.5 | $C_{13}H_{16}N_4O_3S$ | 50.61 | 50.66 | 5.20 | 5.26 | 18.16 | 18.33 | 10.40 | 10.52 |
| 1-p-Toluenesulfonyl-Δ⁸-hexahydro-1,4,8-pyrimidazole | 99.5 | 174–177 | $C_{13}H_{17}N_3O_2S$ | 55.89 | 56.22 | 6.13 | 6.11 | 15.04 | 15.12 | 11.48 | 11.31 |
| 1-p-Acetylaminobenzenesulfonyl-Δ⁸-Hexahydro-1,4,8-pyrimidazole | 59.1 | 267–269 | $C_{14}H_{18}N_4O_3S$ | 52.16 | 52.30 | 5.63 | 5.71 | 17.39 | 17.69 | 9.94 | 9.95 |
| 1-p-Toluenesulfonyl-Δ⁹-1,4,9-triazabicyclo (5.3.0) decene | 86.5 | 110.5–111.5 | $C_{14}H_{19}N_3O_2S$ | 57.31 | 57.12 | 6.53 | 6.67 | 14.32 | 14.51 | 10.93 | 11.16 |
| 1-p-Acetylaminobenzenesulfonyl-Δ⁹-1,4,9-triazabicyclo (5.3.0) decene | 72.0 | 236–238 | $C_{15}H_{20}N_4O_3S$ | 53.55 | 53.33 | 5.99 | 6.13 | 16.66 | 16.52 | 9.54 | 9.43 |
| 1-p-Nitrobenzenesulfonyl-2,3,5,6-tetrahydro-1-imidaz (1,2-a) imidazole | 97.9 | 179–180 | $C_{11}H_{12}N_4O_4S$ | 44.58 | 44.72 | 4.08 | 4.16 | 18.91 | 19.36 | 10.82 | 10.74 |
| 1-p-Aminobenzenesulfonyl-2,3,5,6-tetrahydro-1-imidaz (1,2-a) imidazole | 85.8 | 185–186 | $C_{11}H_{14}N_4O_2S$ | 49.60 | 49.23 | 5.30 | 5.36 | 21.04 | 21.09 | 12.04 | 12.05 |
| 1-p-Aminobenzenesulfonyl-Δ⁹-1,4,9-triazabicyclo (5.3.0) decene | 63.0 | 207–208.5 | $C_{13}H_{18}N_4O_2S$ | 53.05 | 53.45 | 6.16 | 6.40 | 19.03 | 18.81 | 10.90 | 10.48 |

TABLE II.—EVALUATION OF SULFONAMIDES AS BACTERIOSTATS

| Test Organisms | I¹ Mg./ml. | II Mg./ml. | III Mg./ml. | IV Mg./ml. | V Mg./ml. | VI Mg./ml. |
|---|---|---|---|---|---|---|
| Staph. pyogenes (R) | 4 | 4 | 6 | 3 | 6 | 5 |
| Sarcina lutea | 3 | 2 | | 3 | 4 | 1 |
| Strept. faecalis | 4 | 5 | 6 | 3 | 6 | 5 |
| Aero. aerogenes | 4 | 2 | 6 | 3 | 3 | 3 |
| E. coli #198 | 3 | 3 | 6 | 3 | 4 | 4 |
| S. pullorum | 4 | 4 | | 3 | 4 | 5 |
| Ps. aeruginosa | 4 | 5 | | 3 | 4 | 3 |
| Pr. mirabilis | 4 | 4 | | 3 | 4 | 4 |
| Pr. vulgaris | 5 | | 6 | | 5 | |
| Staph. pyogenes (S) | 3 | | | | 7 | |

¹ 1-p-acetylaminobenzenesulfonyl-Δ⁹-1,4,9-triazabicyclo (5.3.0) decene.
II. 1-p-toluenesulfonyl-Δ⁹-1,4,9-triazabicyclo (5.3.0) decene.
III. 1-p-toluenesulfonyl-Δ⁸-hexahydro-1,4,8-pyrimidazole.
IV. 1-p-acetylaminobenzenesulfonyl-Δ⁸-hexahydro-1,4,8-pyrimidazole.
V. 1-p-acetylaminobenzenesulfonyl-2,3,5,6-tetrahydro-1-imidaz (1,2-a) imidazole.
VI. 1-p-aminobenzenesulfonyl-2,3,5,6-tetrahydro-1-imidaz (1,2-a) imidazole.
This table shows minimum concentrations effective to prevent growth of the organisms stated.

We claim:
1. A sulfonyl derivative of bicyclic guanidine corresponding to the general formula

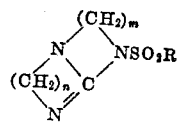

wherein $n$ is an integer from 2 to 4, $m$ is an integer from 2 to 3 and R is a radical selected from the group consisting of para-nitro phenyl, para-amino phenyl, para-acetylamino phenyl and para-methyl phenyl.

2. 1-p-aminobenzenesulfonyl - 2,3,5,6-tetrahydro-1-imidaz (1,2-a) imidazole.

3. 1-p-toluenesulfonyl - $\Delta^9$ - 1,4,9 - triazabicyclo (5.3.0) decene.

4. 1-p-acetylaminobenzenesulfonyl-$\Delta^9$-1,4,9 - triazabicyclo (5.3.0) decene.

References Cited in the file of this patent
UNITED STATES PATENTS
2,229,784  Winnek _____ Jan. 28, 1941